United States Patent
Akutsu et al.

(10) Patent No.: US 11,472,480 B2
(45) Date of Patent: Oct. 18, 2022

(54) ELECTRIC POWER STEERING DEVICE

(71) Applicant: Mitsubishi Electric Corporation, Tokyo (JP)

(72) Inventors: Satoru Akutsu, Tokyo (JP); Yoshihito Asao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 858 days.

(21) Appl. No.: 16/317,915

(22) PCT Filed: Oct. 4, 2016

(86) PCT No.: PCT/JP2016/079549
§ 371 (c)(1),
(2) Date: Jan. 15, 2019

(87) PCT Pub. No.: WO2018/020694
PCT Pub. Date: Feb. 1, 2018

(65) Prior Publication Data
US 2019/0291780 A1 Sep. 26, 2019

(30) Foreign Application Priority Data
Jul. 29, 2016 (JP) .............................. JP2016-149349

(51) Int. Cl.
*B62D 7/14* (2006.01)
*B62D 5/04* (2006.01)
*B62D 7/15* (2006.01)

(52) U.S. Cl.
CPC .............. *B62D 7/14* (2013.01); *B62D 5/0403* (2013.01); *B62D 5/046* (2013.01); *B62D 5/0484* (2013.01);
(Continued)

(58) Field of Classification Search
CPC .................................. B62D 7/14; B62D 5/046
See application file for complete search history.

(56) References Cited

U.S. PATENT DOCUMENTS 5,257,191 A * 10/1993 Takehara ............. B62D 7/1581
180/404
2013/0062138 A1* 3/2013 Naitou ................... B62D 5/046
318/400.2

FOREIGN PATENT DOCUMENTS

CN 101357596 B * 5/2012 ............. B60L 50/40
CN 103213517 A 7/2013
(Continued)

OTHER PUBLICATIONS

Notification of Reasons for Refusal of Japanese Application No. 2016-149349 dated May 9, 2017.
(Continued)

*Primary Examiner* — Jacob D Knutson
(74) *Attorney, Agent, or Firm* — Sughrue Mion, PLLC; Richard C. Turner

(57) ABSTRACT

Provided is an electric power steering device including: a front-wheel steering mechanism, which is provided to front wheels of a vehicle, and includes a front-wheel steering motor as a drive source; and a rear-wheel steering mechanism, which is provided to rear wheels of the vehicle, and includes a rear-wheel steering motor as a drive source, wherein the rear-wheel steering motor is configured to be a double-inverter three-phase duplex motor, the double-inverter three-phase duplex motor including two three-phase windings and two inverters each configured to individually drive one of the two three-phase windings. Therefore, the electric power steering device is capable of, even when a failure has occurred in the steering motor of the rear-wheel steering mechanism, maintaining a function of the rear-wheel steering mechanism to secure behavior stability of the vehicle.

4 Claims, 10 Drawing Sheets

(52) U.S. Cl.
CPC ........... *B62D 5/0487* (2013.01); *B62D 7/148* (2013.01); *B62D 7/1581* (2013.01)

(56) References Cited

FOREIGN PATENT DOCUMENTS

| | | | |
|---|---|---|---|
| DE | 10 2014 224 970 A1 | 6/2016 | |
| DE | 102014224970 A1 * | 6/2016 | ........... B62D 5/0418 |
| JP | 05-193511 A | 8/1993 | |
| JP | 2004-142622 A | 5/2004 | |
| JP | 2007-331581 A | 12/2007 | |
| JP | 2007331581 A * | 12/2007 | |
| JP | 2007331639 A * | 12/2007 | ............... H02K 3/28 |
| JP | 2010-159002 A | 7/2010 | |
| JP | 4692403 B2 * | 6/2011 | |
| JP | 2013-059208 A | 3/2013 | |
| JP | 6060555 A | 1/2017 | |
| WO | 2016/063368 A1 | 4/2016 | |

OTHER PUBLICATIONS

International Search Report of PCT/JP2016/079549 dated Nov. 22, 2016 [PCT/ISA/210].
Communication from the Indian Intellectual Property Office dated Mar. 11, 2021 in Application No. 201947000961.
Communication dated Aug. 9, 2019, from the European Patent Office in counterpart European Application No. 16910597.0.

\* cited by examiner

ELECTRIC POWER STEERING DEVICE

CROSS REFERENCE TO RELATED APPLICATIONS

This application is a National Stage of International Application No. PCT/JP2016/079549, filed Oct. 4, 2016, claiming priority based on Japanese Patent Application No. 2016-149349, filed Jul. 29, 2016.

TECHNICAL FIELD

The present invention relates to an electric power steering device including a steering mechanism provided to each of front wheels and rear wheels of a vehicle.

BACKGROUND ART

In a related-art electric power steering device for a vehicle, which includes a steering mechanism provided to each of front wheels and rear wheels of the vehicle, the electric power steering device is configured to stop a function of the steering mechanism provided to the rear wheels (hereinafter referred to as "rear-wheel steering mechanism") when a failure has occurred in a steering motor of the rear-wheel steering mechanism (see, for example, Patent Literature 1).

CITATION LIST

Patent Literature

[PTL 1] JP 2010-159002 A (See, for example, [0046])

SUMMARY OF INVENTION

Technical Problem

In the related-art electric power steering device for a vehicle described in Patent Literature 1, when a failure has occurred in the steering motor of the rear-wheel steering mechanism, the function of the rear-wheel steering mechanism is stopped, and hence there is a problem in that behavior stability of the vehicle is decreased.

The present invention has been made in order to solve the above-mentioned problem, and has an object to provide an electric power steering device capable of, even when a failure has occurred in a steering motor of a rear-wheel steering mechanism, maintaining a function of the rear-wheel steering mechanism to secure behavior stability of a vehicle.

Solution to Problem

According to one embodiment of the present invention, there is provided an electric power steering device including: a front-wheel steering mechanism, which is provided to front wheels of a vehicle, and includes a front-wheel steering motor as a drive source; and a rear-wheel steering mechanism, which is provided to rear wheels of the vehicle, and includes a rear-wheel steering motor as a drive source, wherein the rear-wheel steering motor is configured to be a double-inverter three-phase duplex motor, the double-inverter three-phase duplex motor including two three-phase windings and two inverters each configured to individually drive one of the two three-phase windings.

Advantageous Effects of Invention

According to the one embodiment of the present invention, it is possible to provide the electric power steering device capable of, even when a failure has occurred in the steering motor of the rear-wheel steering mechanism, maintaining the function of the rear-wheel steering mechanism to secure behavior stability of the vehicle.

DESCRIPTION OF EMBODIMENTS

Now, an electric power steering device according to exemplary embodiments of the present invention is described with reference to the accompanying drawings. In the illustration of the drawings, the same components are denoted by the same reference symbols, and the overlapping description thereof is herein omitted.

First Embodiment

Figure 1:
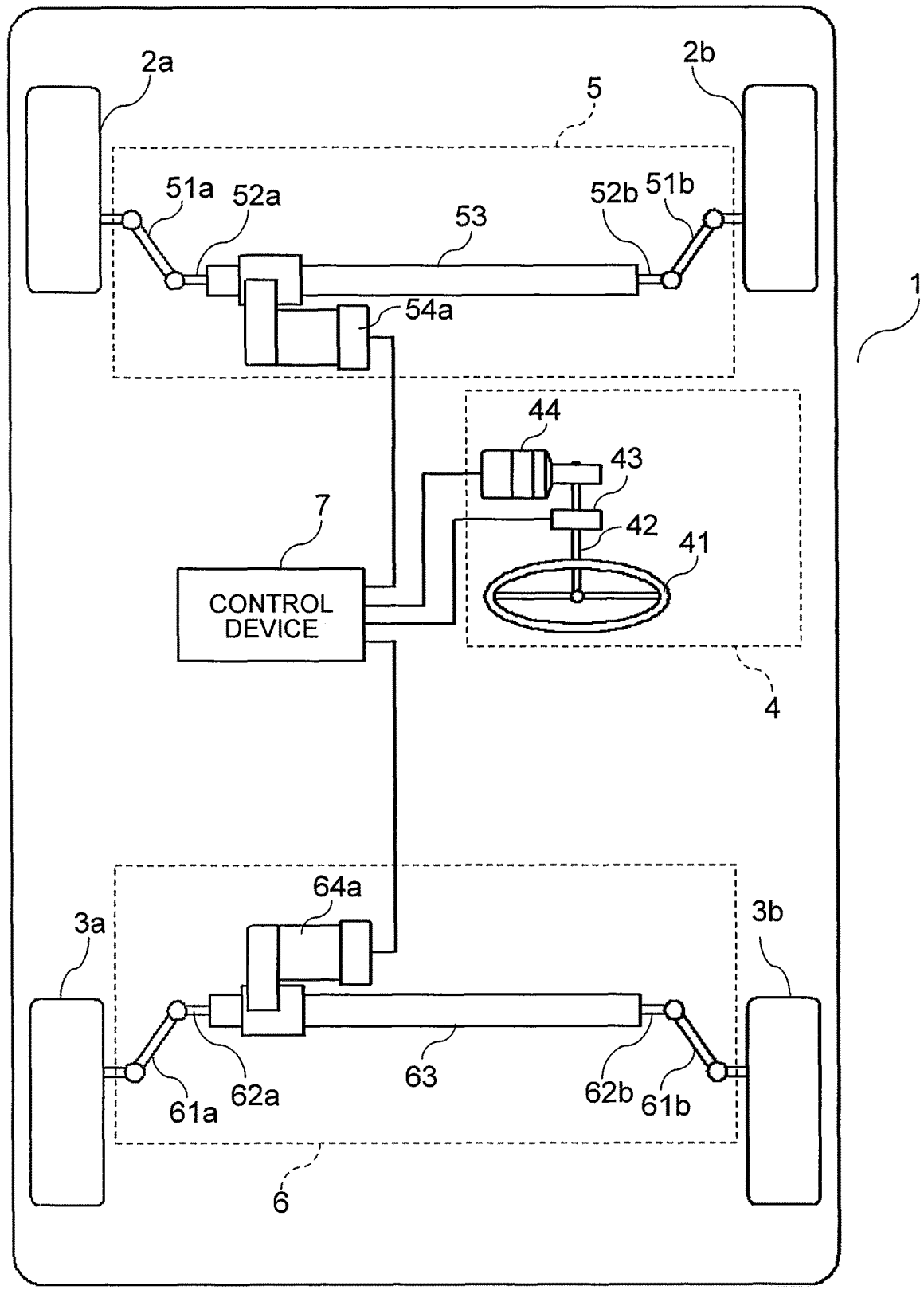
FIG. 1 is a system configuration diagram for illustrating an electric power steering device according to a first embodiment of the present invention.

FIG. 1 is a system configuration diagram for illustrating an electric power steering device according to a first embodiment of the present invention. FIG. 1 is an illustration of an exemplary case in which the electric power steering device is mounted to a vehicle 1 including front wheels 2a and 2b and rear wheels 3a and 3b.

The electric power steering device according to the first embodiment includes a steering input mechanism 4, a front-wheel steering mechanism 5, a rear-wheel steering mechanism 6, and a control device 7.

The steering input mechanism 4 includes a steering wheel 41, a steering shaft 42, a steering sensor 43, and a reaction force motor 44.

The steering wheel 41 is operated by a driver of the vehicle 1. The steering shaft 42 is coupled to the steering wheel 41. The steering sensor 43 is mounted to the steering shaft 42, and detects a steering angle of the driver. The reaction force motor 44 is mounted to the steering shaft 42, and applies a steering reaction force to steering of the driver.

The front-wheel steering mechanism 5 is provided to the front wheels 2a and 2b of the vehicle 1, and includes front-wheel knuckle arms 51a and 51b, front-wheel tie rods 52a and 52b, a front-wheel rack shaft 53, a front-wheel steering motor 54a, which serves as a drive source.

The front-wheel tie rods 52a and 52b coupled to the front-wheel rack shaft 53 are connected to the front-wheel knuckle arms 51a and 51b connected to the front wheels 2a and 2b, which serve as steering control wheels, respectively. The movement of the front-wheel rack shaft 53 is transmitted to the front wheels 2a and 2b via the front-wheel tie rods 52a and 52b and the front-wheel knuckle arms 51a and 51b, to thereby control steering of the front wheels 2a and 2b, respectively.

The front-wheel steering motor 54a is mounted to the front-wheel rack shaft 53, and output of the front-wheel steering motor 54a serves as a motive force for moving the front-wheel rack shaft 53.

The rear-wheel steering mechanism 6 is provided to the rear wheels 3a and 3b of the vehicle 1, and includes rear-wheel knuckle arms 61a and 61b, rear-wheel tie rods 62a and 62b, a rear-wheel rack shaft 63, and a rear-wheel steering motor 64a, which serves as a drive source.

The rear-wheel tie rods 62a and 62b coupled to the rear-wheel rack shaft 63 are connected to the rear-wheel knuckle arms 61a and 61b connected to the rear wheels 3a and 3b, respectively. The movement of the rear-wheel rack shaft 63 is transmitted to the rear wheels 3a and 3b via the rear-wheel tie rods 62a and 62b and the rear-wheel knuckle arms 61a and 61b, to thereby control steering of the rear wheels 3a and 3b, respectively.

The rear-wheel steering motor 64a is mounted to the rear-wheel rack shaft 63, and output of the rear-wheel steering motor 64a serves as a motive force for moving the rear-wheel rack shaft 63.

Each of the front-wheel steering motor 54a and the rear-wheel steering motor 64a is configured to be a double-inverter three-phase duplex motor. The double-inverter three-phase duplex motor as used herein refers to a motor including two three-phase windings and two inverters each configured to individually drive one of the three-phase windings, and being configured not to completely lose its function as a motor even when a failure occurs therein. Details of a configuration of the double-inverter three-phase duplex motor are described later.

The steering input mechanism 4 and the front-wheel steering mechanism 5 are not mechanically coupled to each other, and the control device 7 appropriately controls an operation of each of the front-wheel steering motor 54a, the reaction force motor 44, and the rear-wheel steering motor 64a based on signals input from the steering sensor 43 and the like.

Through the above-mentioned configuration of the electric power steering device, it is possible to implement an electric power steering device capable of performing steering in a manner that suits the operation of the driver, which is a so-called steer-by-wire electric power steering device.

Figure 2:
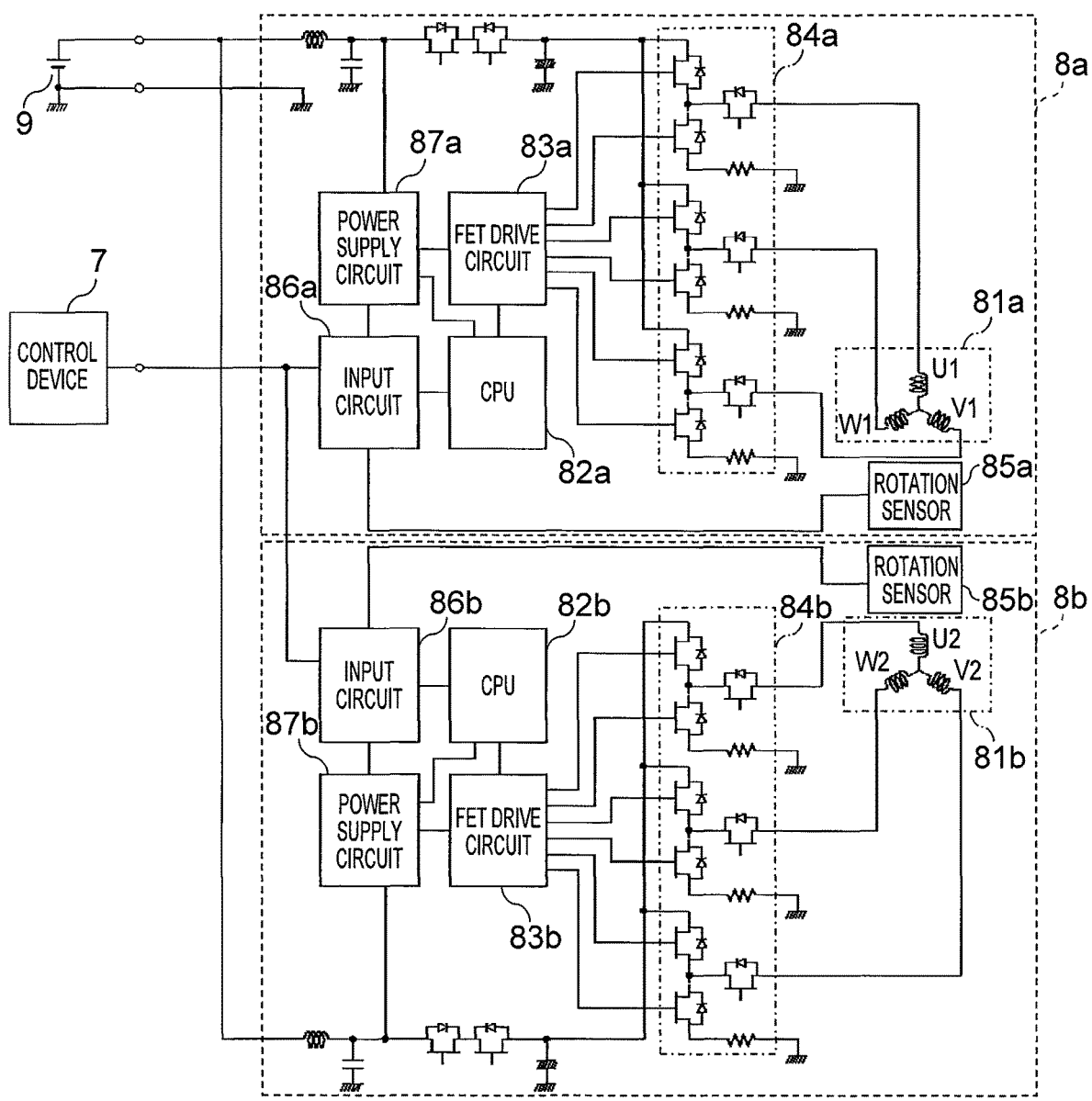
FIG. 2 is a circuit diagram for illustrating a configuration of a double-inverter three-phase duplex motor to be applied to each of a front-wheel steering motor and a rear-wheel steering motor in the first embodiment of the present invention.

Next, the configuration of the double-inverter three-phase duplex motor is described with reference to FIG. 2. FIG. 2 is a circuit diagram for illustrating the double-inverter three-phase duplex motor to be applied to each of the front-wheel steering motor 54a and the rear-wheel steering motor 64a in the first embodiment of the present invention.

As illustrated in FIG. 2, the double-inverter three-phase duplex motor includes a first system 8a and a second system 8b. The first system 8a includes a three-phase winding 81a, a CPU 82a, an FET drive circuit 83a, an inverter 84a, a rotation sensor 85a, an input circuit 86a, and a power supply circuit 87a. The second system 8b includes a three-phase winding 81b, a CPU 82b, an FET drive circuit 83b, an inverter 84b, a rotation sensor 85b, an input circuit 86b, and a power supply circuit 87b.

Connection terminals U1, V1, and W1 of the three-phase winding 81a of the first system 8a are connected to the inverter 84a to be controlled by the CPU 82a and the drive circuit FET drive circuit 83a. Similarly, connection terminals U2, V2, and W2 of the three-phase winding 81b of the second system 8b are connected to the inverter 84b to be controlled by the CPU 82b and the FET drive circuit 83b.

A signal from the rotation sensor 85a configured to detect rotation of a rotor of the motor is input to the input circuit 86a of the first system 8a to be used for control of the motor. The CPU 82a, the FET drive circuit 83a, and the input circuit 86a are supplied with electric power from the power supply circuit 87a. A power supply 9 of the vehicle 1 is connected to the inverter 84a so that the inverter 84a is supplied with electric power for driving the motor.

Similarly, a signal from the rotation sensor 85b is input to the input circuit 86b of the second system 8b to be used for control of the motor. The CPU 82b, the FET drive circuit 83b, and the input circuit 86b are supplied with electric power from the power supply circuit 87b. The power supply 9 of the vehicle 1 is connected to the inverter 84b so that the inverter 84b is supplied with electric power for driving the motor.

The input circuit 86a and the input circuit 86b are connected to the control device 7, and the control device 7 is configured to control the motor in cooperation with other components of a vehicle system.

Next, a description is given of an operation of the rear-wheel steering motor 64a to be performed when a failure has occurred in the rear-wheel steering motor 64a, to which the double-inverter three-phase duplex motor is applied. In this case, a case in which a failure has occurred in the second system 8b of the rear-wheel steering motor 64a is exemplified for the description.

When the CPU 82b has detected a failure of the second system 8b, the CPU 82b stops the drive by the FET drive circuit 83b, to thereby set a drive current for the three-phase winding 81b of the second system 8b to 0. Accordingly, a torque exerted by the second system 8b becomes 0. As a result, an output torque of the entire rear-wheel steering mechanism 6 exerted at the time of the failure becomes half of an output torque exerted at a normal time, but the rear-wheel steering mechanism 6 does not completely lose its function, and can thus continue steering. In this case, the CPU 82b transmits failure information to the control device 7 via the input circuit 86b so as to enable the control device 7 to appropriately control the vehicle 1.

Further, simultaneously with the stop of drive of the second system 8b, the control device 7 performs control of increasing a drive current for the three-phase winding 81a of the first system 8a to double of a drive current exerted at the normal time. Accordingly, a torque exerted by the first system 8*a* becomes double of a torque exerted at the normal time, and the increased torque supplements the torque that has been exerted by the second system 8*b*. As a result, the output torque of the entire rear-wheel steering mechanism 6 can be kept at the same level as that exerted at the normal time.

As described above, according to the first embodiment, the rear-wheel steering motor of the rear-wheel steering mechanism is configured to be the double-inverter three-phase duplex motor. Further, the front-wheel steering motor of the front-wheel steering mechanism is configured to be the double-inverter three-phase duplex motor.

With this configuration, even when a failure has occurred in the rear-wheel steering motor of the rear-wheel steering mechanism, the function of the rear-wheel steering mechanism is maintained. Thus, it is possible to avoid a situation in which, as in the related art, a vehicle is stopped with the rear wheels being steered when a failure has occurred, and behavior stability of the vehicle is consequently decreased. As a result, the safety of the vehicle can be further improved. In other words, even when a failure has occurred in the steering motor of the rear-wheel steering mechanism, the function of the rear-wheel steering mechanism can be maintained, and the behavior stability of the vehicle can thus be secured.

In the first embodiment, the case in which the present invention is applied to the electric power steering device in which the type of steering mechanism is a steer-by-wire steering mechanism has been exemplified, but the type of steering mechanism is not limited thereto. The present invention is also applicable to an electric power steering device employing a related-art type of steering mechanism in which the steering wheel and the front-wheel steering mechanism are mechanically coupled to each other.

Further, in the first embodiment, the configuration of the double-inverter three-phase duplex motor in which two CPUs are included has been exemplified, but the configuration in which a single CPU is included may be employed. In addition, the motor is not limited to a three-phase motor.

Second Embodiment

In a second embodiment of the present invention, a description is given of an electric power steering device including a rear-wheel steering mechanism 6 including, in the configuration of the first embodiment described above, in place of the rear-wheel steering motor 64*a*, two rear-wheel steering motors 65*a* and 65*b*, to each of which a single-inverter three-phase motor is applied. In the second embodiment, a description of the same configuration as that of the first embodiment described above is omitted, and differences from the first embodiment described above are mainly described.

Figure 3:
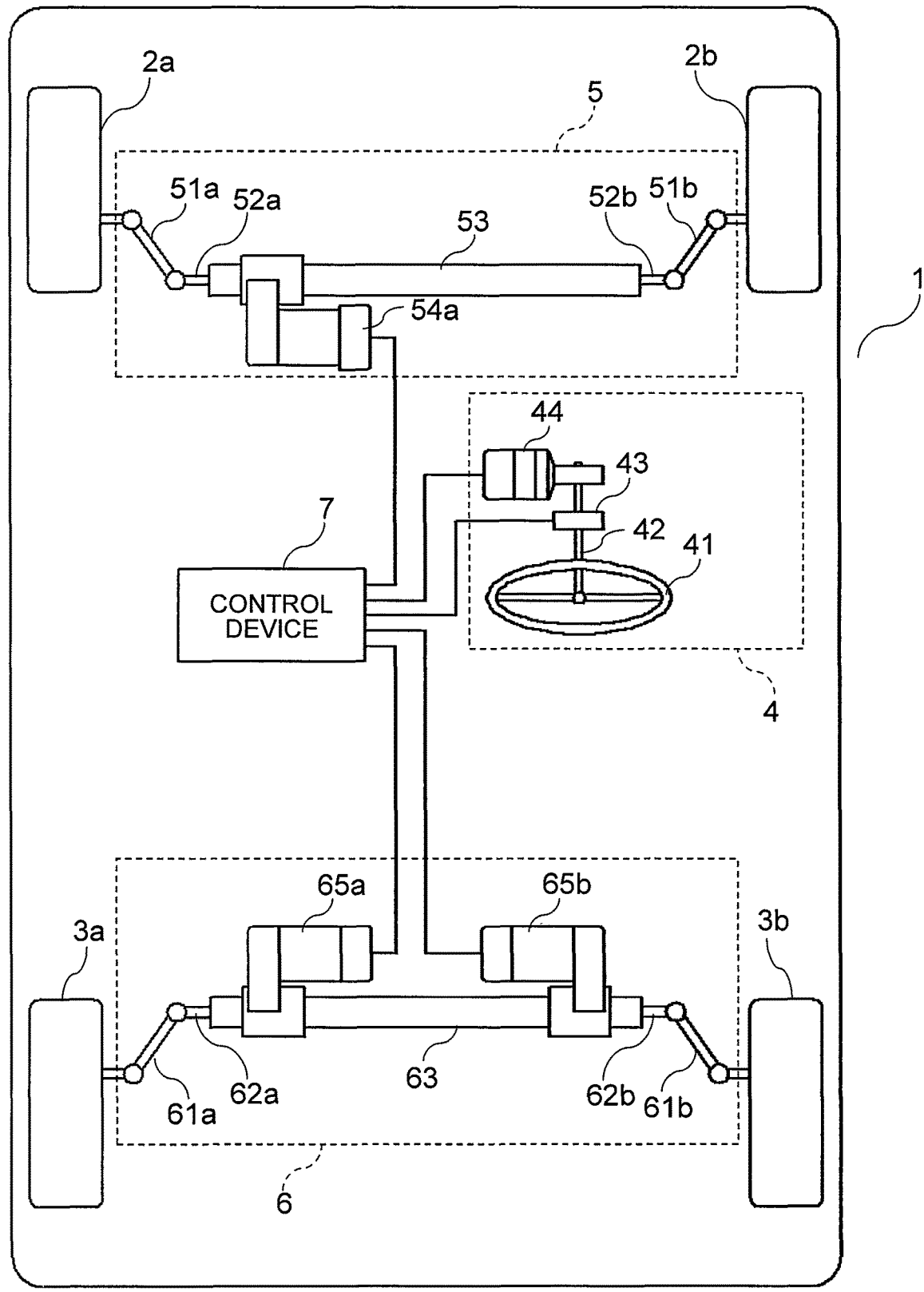
FIG. 3 is a system configuration diagram for illustrating an electric power steering device according to a second embodiment of the present invention.

FIG. 3 is a system configuration diagram for illustrating the electric power steering device according to the second embodiment of the present invention. The electric power steering device according to the second embodiment includes the steering input mechanism 4, the front-wheel steering mechanism 5, the rear-wheel steering mechanism 6, and the control device 7.

The rear-wheel steering mechanism 6 is provided to the front wheels 3*a* and 3*b* of the vehicle 1, and includes the rear-wheel knuckle arms 61*a* and 61*b*, the rear-wheel tie rods 62*a* and 62*b*, the rear-wheel rack shaft 63, the two rear-wheel steering motors 65*a* and 65*b*, each of which serves as a drive source.

The rear-wheel steering motors 65*a* and 65*b* are mounted to the rear-wheel rack shaft 63, and output of the rear-wheel steering motors 65*a* and 65*b* serves as a motive force for moving the rear-wheel rack shaft 63.

The front-wheel steering motor 54*a* is configured to be a double-inverter three-phase duplex motor in the same manner as in the first embodiment described above. The rear-wheel steering motors 65*a* and 65*b* are each configured to be a single-inverter three-phase motor. The single-inverter three-phase motor as used herein refers to a motor including a single three-phase winding and a single inverter configured to drive the three-phase winding.

The control device 7 appropriately controls, based on signals input from the steering sensor 43 and the like, an operation of each of the front-wheel steering motor 54*a*, the reaction force motor 44, and the rear-wheel steering motors 65*a* and 65*b*.

Next, a description is given of an operation of the rear-wheel steering motors 65*a* and 65*b* to be performed when a failure has occurred in one of the rear-wheel steering motors 65*a* and 65*b*, to each of which the single-inverter three-phase motor is applied. In this case, a case in which a failure has occurred in the rear-wheel steering motor 65*b* is exemplified for the description.

When a CPU (not shown) of the rear-wheel steering motor 65*b* has detected the failure, the CPU sets a drive current for the motor to 0, to thereby stop drive of the motor. Accordingly, a torque exerted by the rear-wheel steering motor 65*b* becomes 0. As a result, an output torque of the entire rear-wheel steering mechanism 6 exerted at the time of the failure has become half of an output torque exerted at a normal time, but the rear-wheel steering mechanism 6 does not completely lose its function, and can thus continue steering. In this case, the CPU of the rear-wheel steering motor 65*b* transmits failure information to the control device 7 so as to enable the control device 7 to appropriately control the vehicle 1.

Further, simultaneously with the stop of drive of the rear-wheel steering motor 65*b*, the control device 7 performs control of increasing a drive current for the rear-wheel steering motor 65*a* to double of a drive current exerted at the normal time. Accordingly, a torque exerted by the rear-wheel steering motor 65*a* becomes double of a torque exerted at the normal time, and the increased torque supplements the torque that has been exerted by the rear-wheel steering motor 65*b*. As a result, the output torque of the entire rear-wheel steering mechanism 6 can be kept at the same level as that exerted at the normal time.

As described above, according to the second embodiment, the two rear-wheel steering motors of the rear-wheel steering mechanism are each configured to be the single-inverter three-phase motor. Further, the front-wheel steering motor of the front-wheel steering mechanism is configured to be the double-inverter three-phase duplex motor.

With this configuration, even when a failure has occurred in the rear-wheel steering motor, the function of the rear-wheel steering motor is maintained. Thus, it is possible to avoid the situation in which, as in the related art, the vehicle is stopped with the rear wheels being steered when a failure has occurred, and behavior stability of the vehicle is consequently decreased. As a result, the safety of the vehicle can be further improved.

In the second embodiment, the case in which the present invention is applied to the electric power steering device in which the type of steering mechanism is a steer-by-wire steering mechanism has been exemplified, but the type of steering mechanism is not limited thereto. The present invention is also applicable to the electric power steering device employing the related-art type of steering mechanism in which the steering wheel and the front-wheel steering mechanism are mechanically coupled to each other. Further, in the second embodiment, the motor is not limited to a three-phase motor.

Third Embodiment

In a third embodiment of the present invention, a description is given of an electric power steering device including a rear-wheel steering mechanism 6 including, in the configuration of the first embodiment described above, two rear-wheel steering motors 64a and 64b, to each of which a double-inverter three-phase duplex motor is applied. In the third embodiment, a description of the same configuration as that of the first embodiment described above is omitted, and differences from the first embodiment described above are mainly described.

Figure 4:
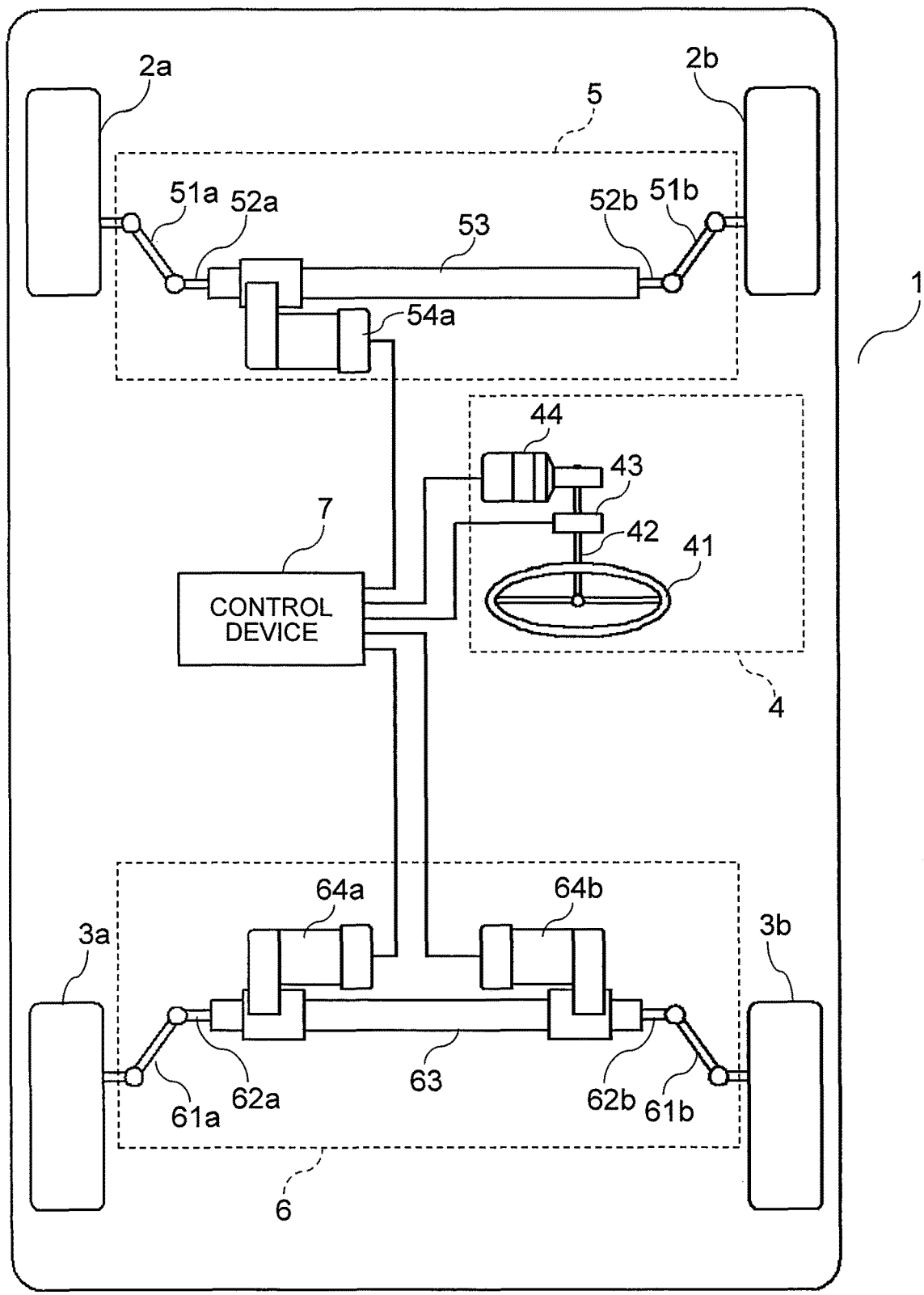
FIG. 4 is a system configuration diagram for illustrating an electric power steering device according to a third embodiment of the present invention.

FIG. 4 is a system configuration diagram for illustrating the electric power steering device according to the third embodiment of the present invention. The electric power steering device according to the third embodiment includes the steering input mechanism 4, the front-wheel steering mechanism 5, the rear-wheel steering mechanism 6, and the control device 7.

The rear-wheel steering mechanism 6 is provided to the rear wheels 3a and 3b of the vehicle 1, and includes the rear-wheel knuckle arms 61a and 61b, the rear-wheel tie rods 62a and 62b, the rear-wheel rack shaft 63, the two rear-wheel steering motors 64a and 64b, each of which serves as a drive source.

The rear-wheel steering motors 64a and 64b are mounted to the rear-wheel rack shaft 63, and output of the rear-wheel steering motors 64a and 64b serves as a motive force for moving the rear-wheel rack shaft 63.

The front-wheel steering motor 54a is configured to be a double-inverter three-phase duplex motor in the same manner as in the first embodiment described above. The rear-wheel steering motors 64a and 64b are each configured to be a double-inverter three-phase duplex motor.

The control device 7 appropriately controls, based on signals input from the steering sensor 43 and the like, an operation of each of the front-wheel steering motor 54a, the reaction force motor 44, and the rear-wheel steering motors 64a and 64b.

Next, a description is given of an operation of the rear-wheel steering motors 64a and 64b to be performed when a failure has occurred in one of the rear-wheel steering motors 64a and 64b, to each of which the double-inverter three-phase duplex motor is applied, with reference to FIG. 2. In this case, a case in which a failure has occurred in the rear-wheel steering motor 64a of the second system 8b is exemplified for the description.

When the CPU 82b has detected the failure of the second system 8b, the CPU 82b stops the drive by the FET drive circuit 83b, to thereby set a drive current for the three-phase winding 81b of the second system 8b to 0. Accordingly, a torque exerted by the second system 8b becomes 0. As a result, an output torque of the rear-wheel steering motor 64a exerted at the time of the failure becomes half of an output torque exerted at a normal time, but the other normal rear-wheel steering motor 64b exerts a normal torque.

Thus, when output of the rear-wheel steering motor 64a, in which the failure has occurred in the second system 8b, and output of the normal rear-wheel steering motor 64b are combined, the entire rear-wheel steering mechanism 6 can exert output that is 75% of the output exerted at the normal time, and can thus exert substantially the same performance as that exerted at the normal time to continue steering. In this case, the CPU 82b transmits failure information to the control device 7 via the input circuit 86b so as to enable the control device 7 to appropriately control the vehicle 1.

In the third embodiment, even when a failure has occurred in one of the four systems of the rear-wheel steering motors 64a and 64b, performance close to that exerted at the normal time can be exerted without increasing the driving currents of the remaining systems. Therefore, increase in heat generation due to increase in driving current can be suppressed, and in addition, a limitation on a time period in which steering can be continued, which is due to the increase in heat generation, is not required to be imposed. Consequently, redundancy and safety of the device can be further increased.

As described above, according to the third embodiment, the two rear-wheel steering motors of the rear-wheel steering mechanism are each configured to be the double-inverter three-phase duplex motor. Further, the front-wheel steering motor of the front-wheel steering mechanism is configured to be the double-inverter three-phase duplex motor.

With this configuration, even when a failure has occurred in the rear-wheel steering motor, the function of the rear-wheel steering motor is maintained. Thus, it is possible to avoid the situation in which, as in the related art, the vehicle is stopped with the rear wheels being steered when a failure has occurred, and behavior stability of the vehicle is consequently decreased. As a result, the safety of the vehicle can be further improved.

In the third embodiment, the case in which the present invention is applied to the electric power steering device in which the type of steering mechanism is a steer-by-wire steering mechanism has been exemplified, but the type of steering mechanism is not limited thereto. The present invention is also applicable to the electric power steering device employing the related-art type of steering mechanism in which the steering wheel and the front-wheel steering mechanism are mechanically coupled to each other.

Further, in the third embodiment, the configuration of the double-inverter three-phase duplex motor in which two CPUs are included has been exemplified, but the configuration in which a single CPU is included may be employed. In addition, the motor is not limited to a three-phase motor.

Fourth Embodiment

Figure 5:
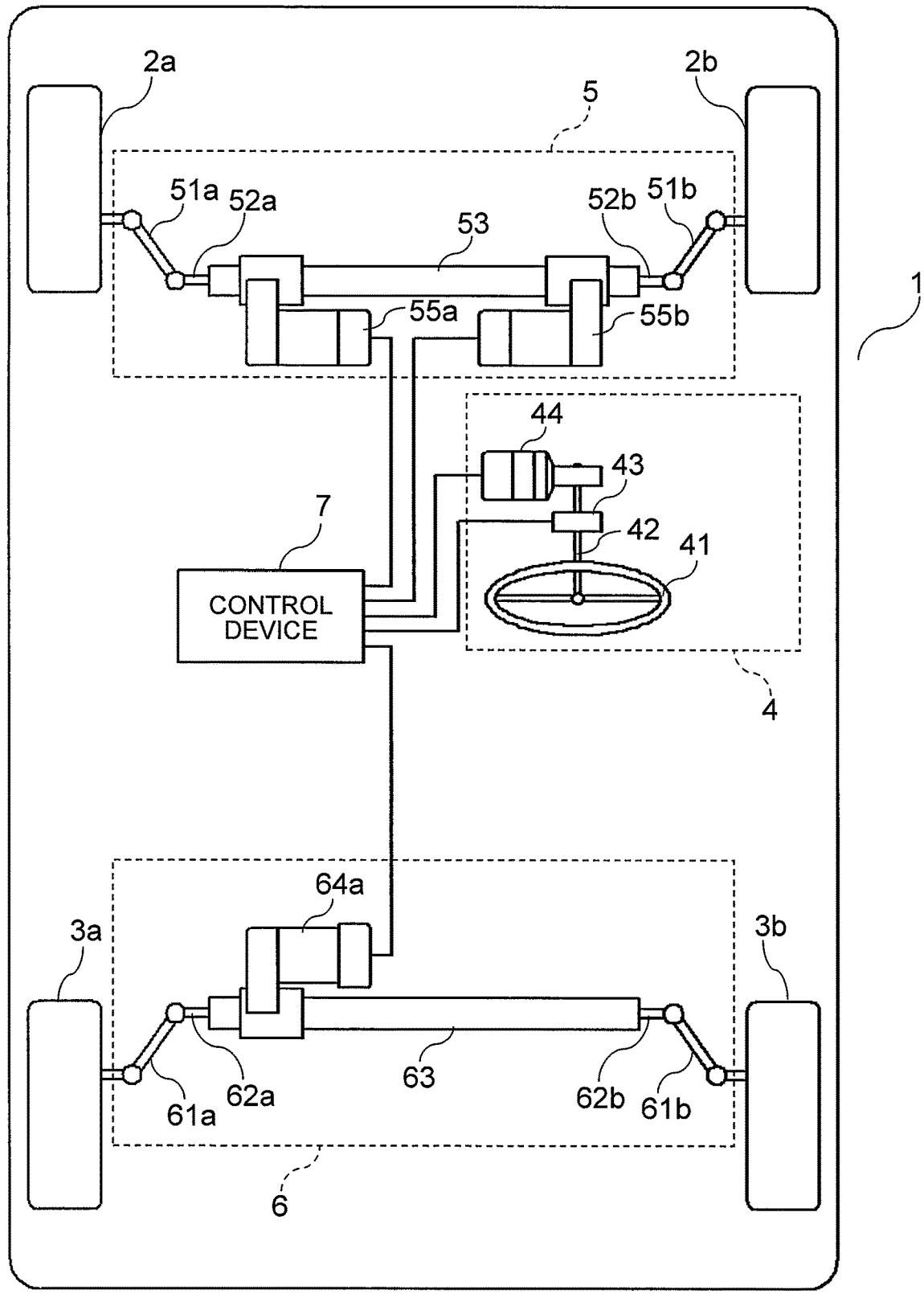
FIG. 5 is a system configuration diagram for illustrating an electric power steering device according to a fourth embodiment of the present invention.

FIG. 5 is a system configuration diagram for illustrating an electric power steering device according to a fourth embodiment of the present invention. In the fourth embodiment, a description of the same configuration as that of the first embodiment described above is omitted, and differences from the first embodiment described above are mainly described.

In the fourth embodiment, as illustrated in FIG. 5, in the configuration of the first embodiment described above, the front-wheel steering mechanism 5 includes two front-wheel steering motors 55a and 55b, to each of which the single-inverter three-phase motor is applied. The front-wheel steering motors 55a and 55b are mounted to the front-wheel rack shaft 53.

As described above, according to the fourth embodiment, even when the two front-wheel steering motors of the front-wheel steering mechanism are each configured to be the single-inverter three-phase motor in the configuration of the first embodiment described above, effects similar to those of the first embodiment can be obtained.

Fifth Embodiment

Figure 6:
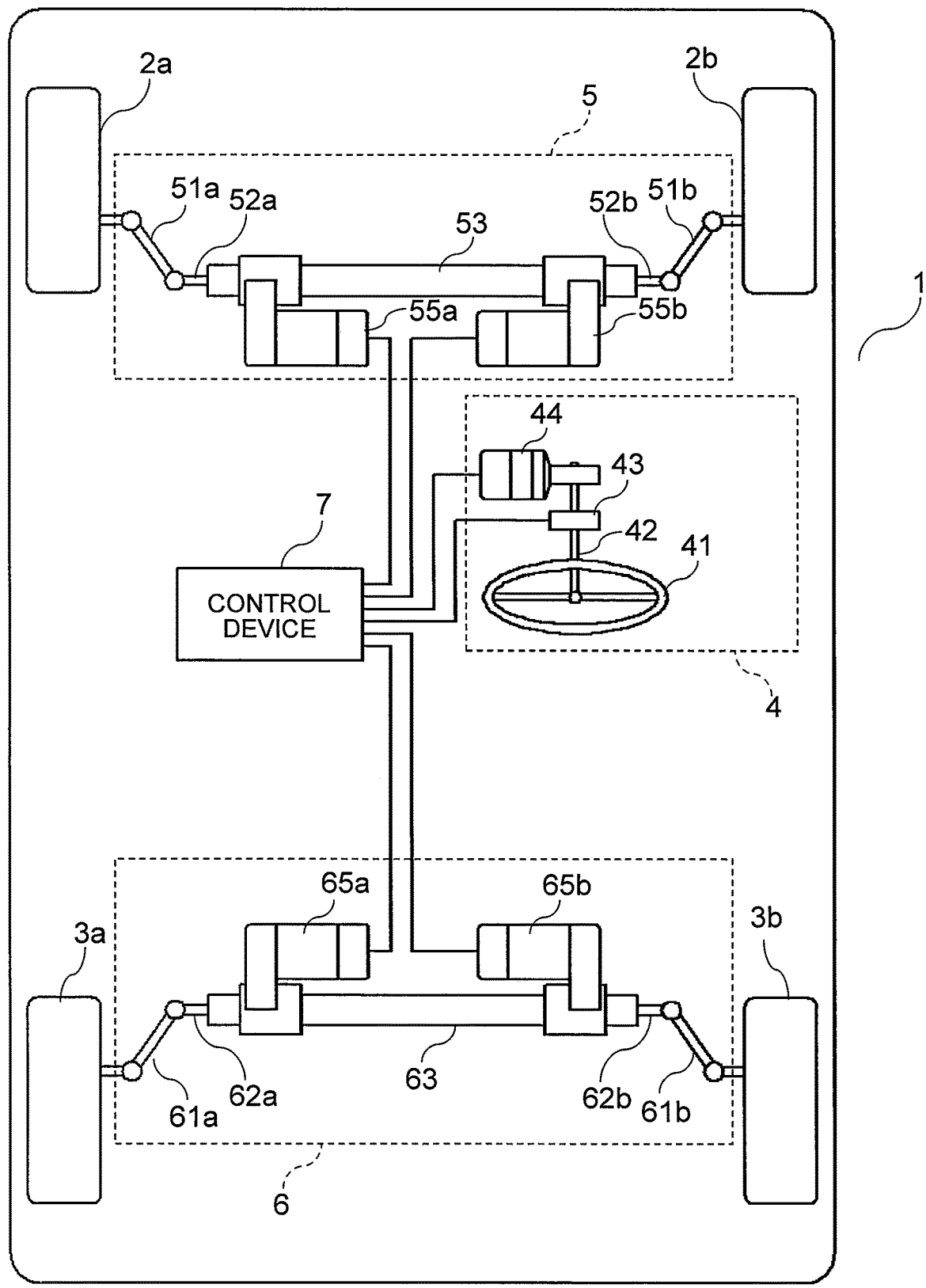
FIG. 6 is a system configuration diagram for illustrating an electric power steering device according to a fifth embodiment of the present invention.

FIG. 6 is a system configuration diagram for illustrating an electric power steering device according to a fifth embodiment of the present invention. In the fifth embodiment, a description of the same configuration as that of the second embodiment described above is omitted, and differences from the second embodiment described above are mainly described.

In the fifth embodiment, as illustrated in FIG. 6, in the configuration of the second embodiment described above, the front-wheel steering mechanism 5 includes the two front-wheel steering motors 55a and 55b, to each of which the single-inverter three-phase motor is applied. The front-wheel steering motors 55a and 55b are mounted to the front-wheel rack shaft 53.

As described above, according to the fifth embodiment, even when the two front-wheel steering motors of the front-wheel steering mechanism are each configured to be the single-inverter three-phase motor in the configuration of the second embodiment described above, effects similar to those of the second embodiment can be obtained.

Sixth Embodiment

Figure 7:
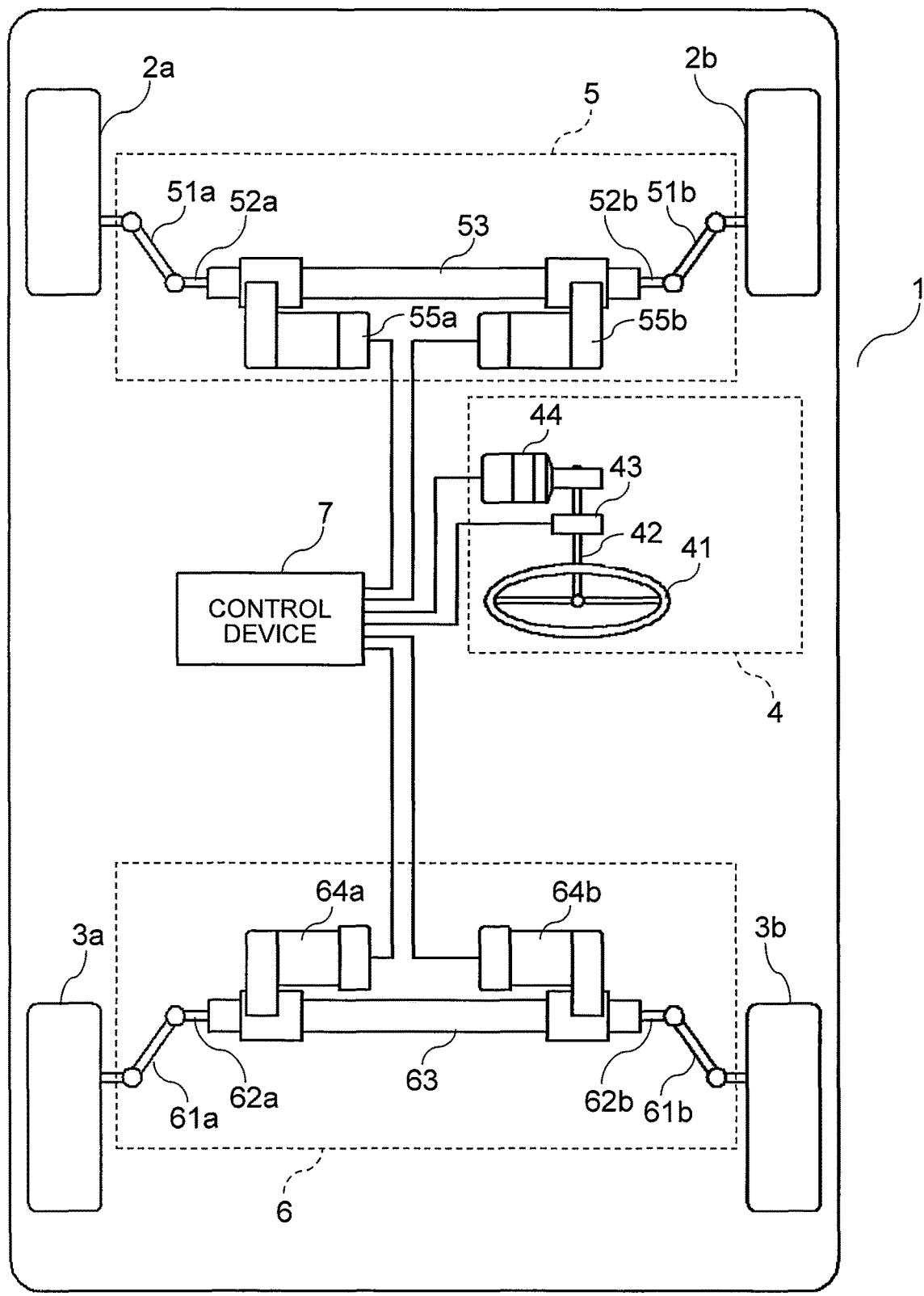
FIG. 7 is a system configuration diagram for illustrating an electric power steering device according to a sixth embodiment of the present invention.

FIG. 7 is a system configuration diagram for illustrating an electric power steering device according to a sixth embodiment of the present invention. In the sixth embodiment, a description of the same configuration as that of the third embodiment described above is omitted, and differences from the first embodiment described above are mainly described.

In the sixth embodiment, as illustrated in FIG. 7, in the configuration of the third embodiment described above, the front-wheel steering mechanism 5 includes the two front-wheel steering motors 55a and 55b, to each of which the single-inverter three-phase motor is applied. The front-wheel steering motors 55a and 55b are mounted to the front-wheel rack shaft 53.

As described above, according to the sixth embodiment, even when the two front-wheel steering motors of the front-wheel steering mechanism are each configured to be the single-inverter three-phase motor in the configuration of the third embodiment described above, effects similar to those of the third embodiment can be obtained.

Seventh Embodiment

Figure 8:
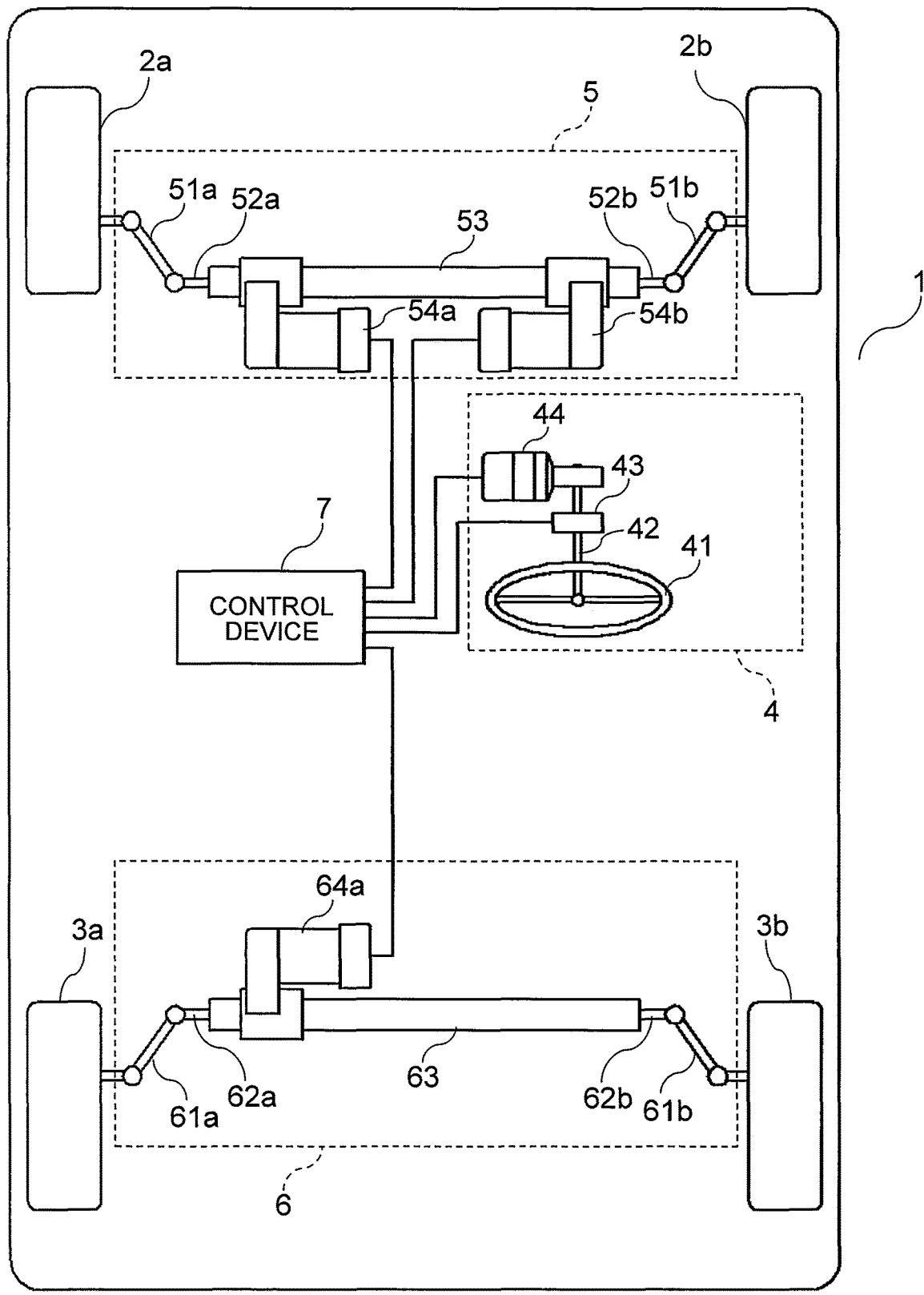
FIG. 8 is a system configuration diagram for illustrating an electric power steering device according to a seventh embodiment of the present invention.

FIG. 8 is a system configuration diagram for illustrating an electric power steering device according to a seventh embodiment of the present invention. In the seventh embodiment, a description of the same configuration as that of the first embodiment described above is omitted, and differences from the first embodiment described above are mainly described.

In the seventh embodiment, as illustrated in FIG. 8, in the configuration of the first embodiment described above, the front-wheel steering mechanism 5 includes the two front-wheel steering motors 54a and 54b, to each of which the double-inverter three-phase duplex motor is applied. The front-wheel steering motors 54a and 54b are mounted to the front-wheel rack shaft 53.

As described above, according to the seventh embodiment, even when the two front-wheel steering motors of the front-wheel steering mechanism are each configured to be the double-inverter three-phase duplex motor in the configuration of the first embodiment described above, effects similar to those of the first embodiment can be obtained.

Eighth Embodiment

Figure 9:
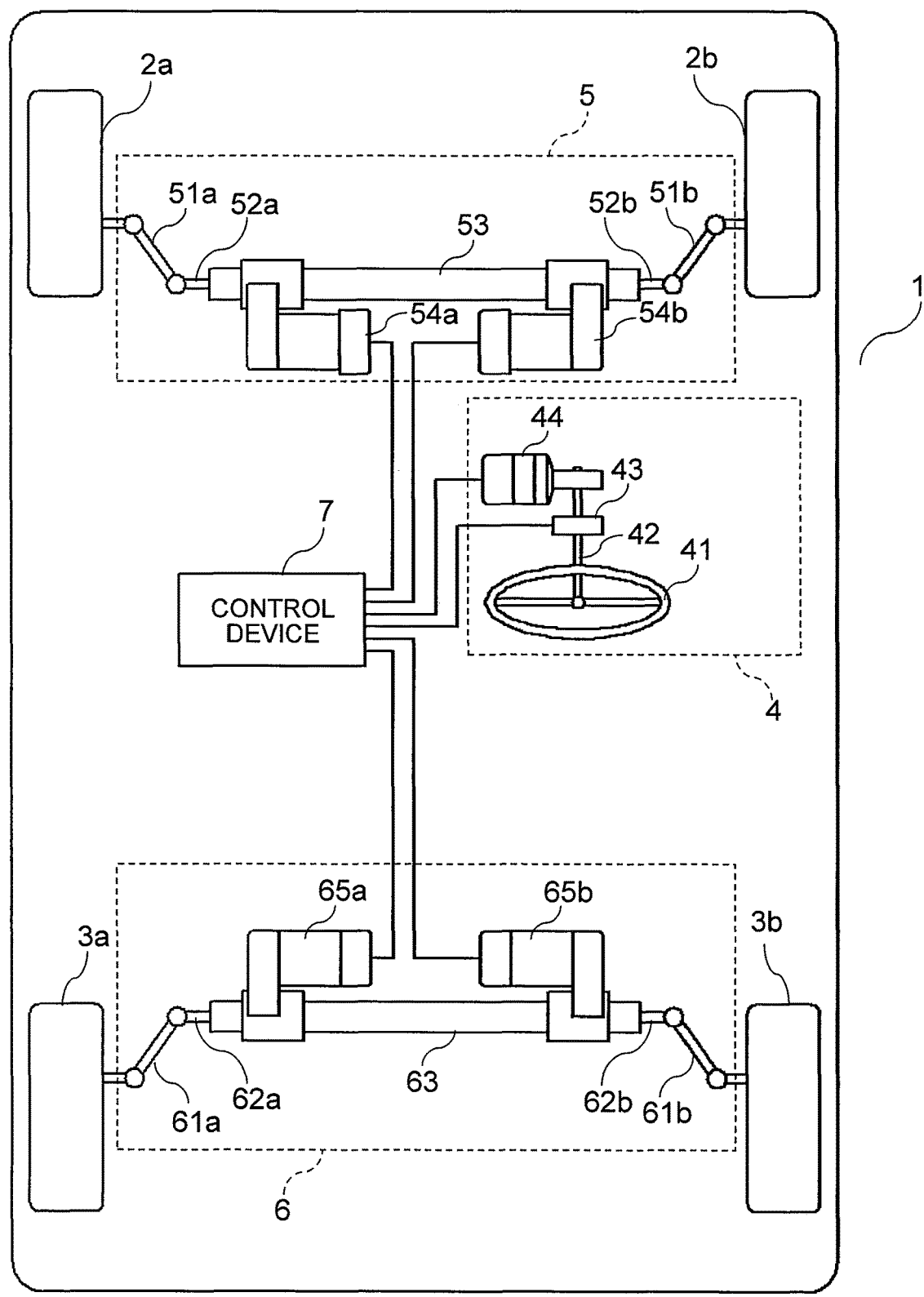
FIG. 9 is a system configuration diagram for illustrating an electric power steering device according to an eighth embodiment of the present invention.

FIG. 9 is a system configuration diagram for illustrating an electric power steering device according to an eighth embodiment of the present invention. In the eighth embodiment, a description of the same configuration as that of the second embodiment described above is omitted, and differences from the second embodiment described above are mainly described.

In the eighth embodiment, as illustrated in FIG. 9, in the configuration of the second embodiment described above, the front-wheel steering mechanism 5 includes the two front-wheel steering motors 54a and 54b, to each of which the double-inverter three-phase duplex motor is applied. The front-wheel steering motors 54a and 54b are mounted to the front-wheel rack shaft 53.

As described above, according to the eighth embodiment, even when the two front-wheel steering motors of the front-wheel steering mechanism are each configured to be the double-inverter three-phase duplex motor in the configuration of the second embodiment described above, effects similar to those of the second embodiment can be obtained.

Ninth Embodiment

Figure 10:
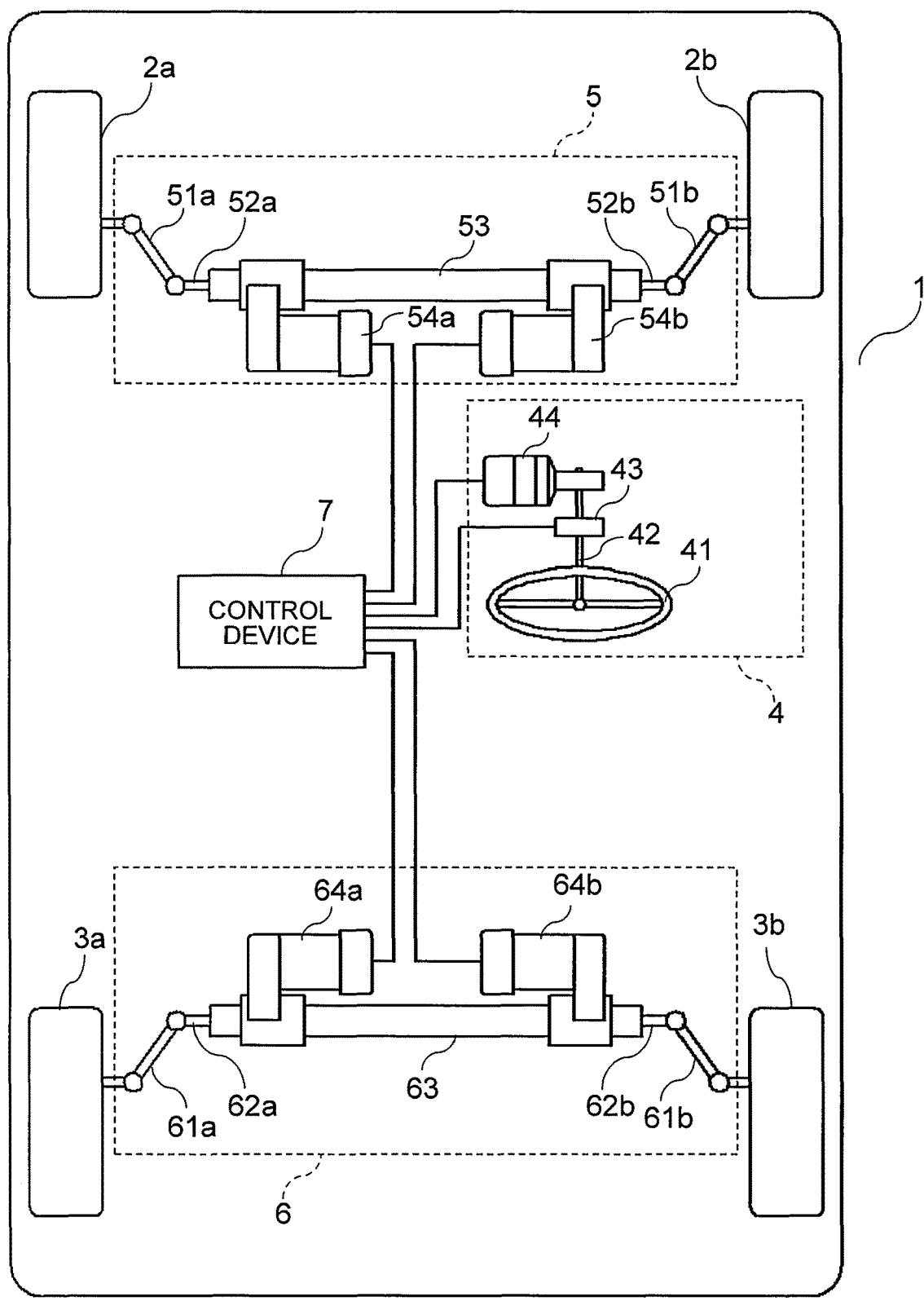
FIG. 10 is a system configuration diagram for illustrating an electric power steering device according to a ninth embodiment of the present invention.

FIG. 10 is a system configuration diagram for illustrating an electric power steering device according to a ninth embodiment of the present invention. In the ninth embodiment, a description of the same configuration as that of the third embodiment described above is omitted, and differences from the third embodiment described above are mainly described.

In the ninth embodiment, as illustrated in FIG. 10, in the configuration of the third embodiment described above, the front-wheel steering mechanism 5 includes the two front-wheel steering motors 54a and 54b, to each of which the double-inverter three-phase duplex motor is applied. The front-wheel steering motors 54a and 54b are mounted to the front-wheel rack shaft 53.

As described above, according to the ninth embodiment, even when the two front-wheel steering motors of the front-wheel steering mechanism are each configured to be the single-inverter three-phase motor in the configuration of the third embodiment described above, effects similar to those of the third embodiment can be obtained.

The invention claimed is:

1. An electric power steering device, comprising:
a front-wheel steering mechanism includes at least one front-wheel steering motor as a drive source, wherein the at least one front-wheel steering motor is mounted to a front-wheel rack shaft having opposing ends connected to front wheels of a vehicle, respectively; and
a rear-wheel steering mechanism including a rear-wheel steering motor as a drive source,
wherein the rear-wheel steering motor is mounted to a rear-wheel rack shaft having opposing ends connected to rear wheels of the vehicle, respectively, and configured to be a double-inverter three-phase duplex motor including two three-phase windings and two inverters, each of the two inverters being configured to individually drive one of the two three-phase windings, and wherein the double-inverter three-phase duplex motor is configured to set a drive current for a second three-phase winding among the two three-phase windings to 0 and double a drive current for a first three-phase winding among the two three-phase windings when the second three-phase winding fails.

2. The electric power steering device according to claim 1, wherein the at least one front-wheel steering motor includes two front-wheel steering motors, each of the two front-wheel steering motors being configured to be a single-inverter three-phase motor including a three-phase winding and an inverter configured to drive the three-phase winding.

3. An electric power steering device, comprising:
a front-wheel steering mechanism includes at least one front-wheel steering motor as a drive source, wherein the at least one front-wheel steering motor is mounted to a front-wheel rack shaft having opposing ends connected to front wheels of a vehicle, respectively; and
a rear-wheel steering mechanism including two rear-wheel steering motors, each of the two rear-wheel steering motors serving as a drive source,
wherein each of the two rear-wheel steering motors is mounted to a rear-wheel rack shaft having opposing ends connected to rear wheels of the vehicle, respectively, and configured to be a single-inverter three-phase motor including a three-phase winding and an inverter configured to drive the three-phase winding,
wherein the at least one front-wheel steering motor is configured to be a double-inverter three-phase duplex motor including two three-phase windings and two inverters, each of which being configured to individually drive one of the two three-phase windings of the double-inverter three-phase duplex motor of the at least one front-wheel steering motor, and
wherein the double-inverter three-phase duplex motor is configured to set a drive current for a second three-phase winding among the two three-phase windings to 0 and double a drive current for a first three-phase winding among the two three-phase windings when the second three-phase winding fails.

4. The electric power steering device according to claim 3, wherein the at least one front-wheel steering motor includes two front-wheel steering motors.

* * * * *